(12) United States Patent
Aleksic et al.

(10) Patent No.: US 6,502,173 B1
(45) Date of Patent: Dec. 31, 2002

(54) SYSTEM FOR ACCESSING MEMORY AND METHOD THEREFORE

(75) Inventors: Milivoje Aleksic, Richmond Hill (CA); Grigory Temkine, Toronto (CA); Oleg Drapkin, Richmond Hill (CA); Carl Mizuyabu, Thornhill (CA); Adrian Hartog, Toronto (CA)

(73) Assignee: ATI Technologies, Inc., Markham (CA)

( * ) Notice: Subject to any disclaimer, the term of this patent is extended or adjusted under 35 U.S.C. 154(b) by 244 days.

(21) Appl. No.: 09/675,293

(22) Filed: Sep. 29, 2000

(51) Int. Cl.<sup>7</sup> .............................................. G06F 12/00
(52) U.S. Cl. .......................................... 711/168; 711/5
(58) Field of Search .............................. 711/5, 105, 168

(56) References Cited

U.S. PATENT DOCUMENTS 6,321,315 B1 * 11/2001 LaBerge ..................... 711/167
6,381,684 B1 * 4/2002 Hronik et al. ......... 365/189.04

* cited by examiner

*Primary Examiner*—Kevin Verbrugge

(57) ABSTRACT

A specific embodiment is disclosed for a method and apparatus for processing data access requests from a requesting device, such as a graphics processor device. Data access commands are provided at a first rate, for example 200M command per second, to a memory bridge. In response to receiving the access requests the memory bridge will provide its own access requests to a plurality of memories at approximately the first rate. In response to the memory bridge requests, the plurality of memories will access a plurality of data a second data rate. When the data access between the memory bridge and the memories is a read request, data is returned to the requesting device at a third data rate which is greater than the first data rate by approximately four times or more. Noise and power reduction techniques can be used on the data bus between the accessing device and the data bridge.

38 Claims, 10 Drawing Sheets

|     | QDR CMD | DDR CMD | DDR DATA | QDR DATA |
| --- | --- | --- | --- | --- |
| T 0 | R0 | | | |
| T 1 | R1 | | | |
| T 2 | R2 | R0 | | |
| T 3 | R3 | R1 | | |
| T 4 | | R2 | | |
| T 5 | | R3 | R0 | |
| T 6 | | | R1 | |
| T 7 | | | R2 | R0 |
| T 8 | | | R3 | R1 |
| T 9 | | | | R2 |
| T 10 | | | | R3 |
| T 11 | | | | |
| T 12 | W0 | | | |
| T 13 | W1 | | | W0 |
| T 14 | W2 | W0 | | W1 |
| T 15 | W3 | W1 | W0 | W2 |
| T 16 | W4 | W2 | W1 | W3 |
| T 17 | W5 | W3 | W2 | W4 |
| T 18 | | W4 | W3 | W5 |
| T 19 | | W5 | W4 | |
| T 20 | R4 | | W5 | |
| T 21 | R5 | | | |
| T 22 | | R4 | | |
| T 23 | | R5 | | |
| T 24 | | | | |
| T 25 | | | R4 | |
| T 26 | | | R5 | |
| T 27 | | | | R4 |
| T 28 | | | | R5 |
| T 29 | | | | |
| T 30 | W6 | | | |
| T 31 | | | | W6 |
| T 32 | | W6 | | |
| T 33 | | | W6 | |

FIGURE 2

|     | QDR CMD | WCP | DDR CMD | | DDR DATA | RBUF | QDR DATA | |
|-----|---------|-----|---------|---|----------|------|----------|---|
| T 0 | R-4 | | | | | | | |
| T 1 | R-3 | | | | | | | |
| T 2 | R-2 | | R-4 | | | | | |
| T 3 | R-1 | | R-3 | | | | | |
| T 4 | R0 | | R-2 | | | | | |
| T 5 | R1 | | R-1 | | R-4 | | | |
| T 6 | R2 | | R0 | | R-3 | R-4 | | |
| T 7 | R3 | | R1 | | R-2 | R-3 | R-4 | |
| T 8 | | | R2 | | R-1 | R-2 | R-3 | |
| T 9 | | | R3 | | R0 | R-1 | R-2 | |
| T 10 | | X | | | R1 | R0 | R-1 | |
| T 11 | | X | | | R2 | R1 | | |
| T 12 | W0 | X | | | R3 | R2 | | |
| T 13 | W1 | X | | | | R3 | W0 | |
| T 14 | W2 | X | W0 | | | | W1 | |
| T 15 | W3 | X | W1 | | W0 | | W2 | |
| T 16 | W4 | X | W2 | | W1 | | W3 | |
| T 17 | W5 | X | W3 | | W2 | | W4 | |
| T 18 | | | W4 | | W3 | | W5 | |
| T 19 | | | W5 | | W4 | | | |
| T 20 | R4 | | | | W5 | | | |
| T 21 | R5 | | | | | | R0 | |
| T 22 | | | R4 | | | | R1 | |
| T 23 | | | R5 | | | | R2 | |
| T 24 | | X | | | | | R3 | |
| T 25 | | X | | | R4 | | | |
| T 26 | W6 | X | | | R5 | R4 | | |
| T 27 | | | | | | R5 | W6 | |
| T 28 | | | W6 | | | | | |
| T 29 | | | | | W6 | | | |
| T 30 | | | | | | | R4 | |
| T 31 | | | | | | | R5 | |
| T 32 | | | | | | | | |
| T 33 | | | | | | | | |

FIGURE 3

| | QDR CMD | DDR CMD | DDR DATA | QDR DATA | WBUF |
|---|---|---|---|---|---|
| T 0 | R0 | | | | |
| T 1 | R1 | | | | |
| T 2 | R2 | R0 | | W0 | |
| T 3 | R3 | R1 | | W1 | W0 |
| T 4 | | R2 | | W2 | W1 |
| T 5 | | R3 | R0 | | W2 |
| T 6 | | | R1 | | |
| T 7 | | | R2 | R0 | |
| T 8 | W0 | | R3 | R1 | |
| T 9 | W1 | | | R2 | |
| T 10 | W2 | W0 | | R3 | |
| T 11 | | W1 | W0 | | |
| T 12 | W3 | W2 | W1 | | |
| T 13 | W4 | | W2 | W3 | |
| T 14 | W5 | W3 | | W4 | |
| T 15 | | W4 | W3 | W5 | |
| T 16 | | W5 | W4 | | |
| T 17 | R4 | | W5 | | |
| T 18 | R5 | | | | |
| T 19 | | R4 | | W6 | |
| T 20 | | R5 | | | W6 |
| T 21 | | | | | |
| T 22 | | | R4 | | |
| T 23 | W6 | | R5 | | |
| T 24 | | | | R4 | |
| T 25 | | W6 | | R5 | |
| T 26 | | | W6 | | |
| T 27 | | | | | |
| T 28 | | | | | |
| T 29 | | | | | |
| T 30 | | | | | |
| T 31 | | | | | |
| T 32 | | | | | |
| T 33 | | | | | |

FIGURE 4

| | QDR CMD | DDR CMD | DDR DATA | RBUF | QDR DATA | WBUF |
|---|---|---|---|---|---|---|
| T 0 | R0 | | | | | |
| T 1 | R1 | | | | | |
| T 2 | R2 | R0 | | | W0 | |
| T 3 | R3 | R1 | | | W1 | W0 |
| T 4 | | R2 | | | W2 | W1 |
| T 5 | | R3 | R0 | | | W2 |
| T 6 | | | R1 | R0 | | |
| T 7 | | | R2 | R1 | R0 | |
| T 8 | W0 | | R3 | R2 | R1 | |
| T 9 | W1 | | | R3 | R2 | |
| T 10 | W2 | W0 | | | | |
| T 11 | W3 | W1 | W0 | | | |
| T 12 | W4 | W2 | W1 | | W3 | |
| T 13 | W5 | W3 | W2 | | W4 | |
| T 14 | | W4 | W3 | | W5 | |
| T 15 | | W5 | W4 | | | |
| T 16 | R4 | | W5 | | | |
| T 17 | R5 | | | | R3 | |
| T 18 | | R4 | | | | |
| T 19 | | R5 | | | | |
| T 20 | | | | | W6 | |
| T 21 | | | R4 | | | W6 |
| T 22 | W6 | | R5 | R4 | | |
| T 23 | | | | R5 | R4 | |
| T 24 | | W6 | | | R5 | |
| T 25 | | | W6 | | | |
| T 26 | | | | | | |
| T 27 | | | | | | |
| T 28 | | | | | | |
| T 29 | | | | | | |
| T 30 | | | | | | |
| T 31 | | | | | | |
| T 32 | | | | | | |
| T 33 | | | | | | |

FIGURE 5

SYSTEM FOR ACCESSING MEMORY AND METHOD THEREFORE

FIELD OF THE INVENTION

The present invention relates generally to accessing data, and in particular to accessing data through a memory bridge at an enhanced data rate.

BACKGROUND OF THE INVENTION

Modern data processing devices, such as multimedia data processors, have migrated towards using large data words to accommodate the transfer data in high speed applications, such as graphics rendering. The implementation of large data words is problematic when external memory devices are used. Specifically, large external data buses increase the pin count of processing devices and the board area needed to route the busses. In addition, large bus sizes often require the use of multiple memory devices to provide the needed data width. The large number of traces associated with a large bus, and the additional memories needed to support the bus width result in increased circuit board size, which is generally not desirable. Therefore, a method and system capable of supporting large data words without the problems of the prior art would be useful.

BRIEF DESCRIPTION OF THE DRAWINGS

Other objects, advantages, features and characteristics of the present invention, as well as methods, operation and functions of related elements of structure, and the combination of parts and economies of manufacture, will become apparent upon consideration of the following description and claims with reference to the accompanying drawings, all of which form a part of this specification, wherein:

FIGS. 2–5 illustrate, in tabular form, read and write access activity on the busses of the system of FIG. 1;

DETAILED DESCRIPTION OF THE FIGURES

In a specific embodiment of the present invention a data access request is made from a requesting device, such as a graphics processor device, to a memory bridge device. Data access request commands are provided at a first rate, for example 200M command per second, to a memory bridge. In response to receiving access requests the memory bridge will provide its own access requests to a plurality of memories at approximately the first rate. In response to the memory bridge requests, the plurality of memories will access a plurality of data at a second data rate. When the data access between the memory bridge and the memories is a read request, data is returned to the requesting device at a third data rate which is greater than the first data rate by approximately four times or more. Noise and power reduction techniques can be used on the data bus between the accessing device and the data bridge.

Figure 1:
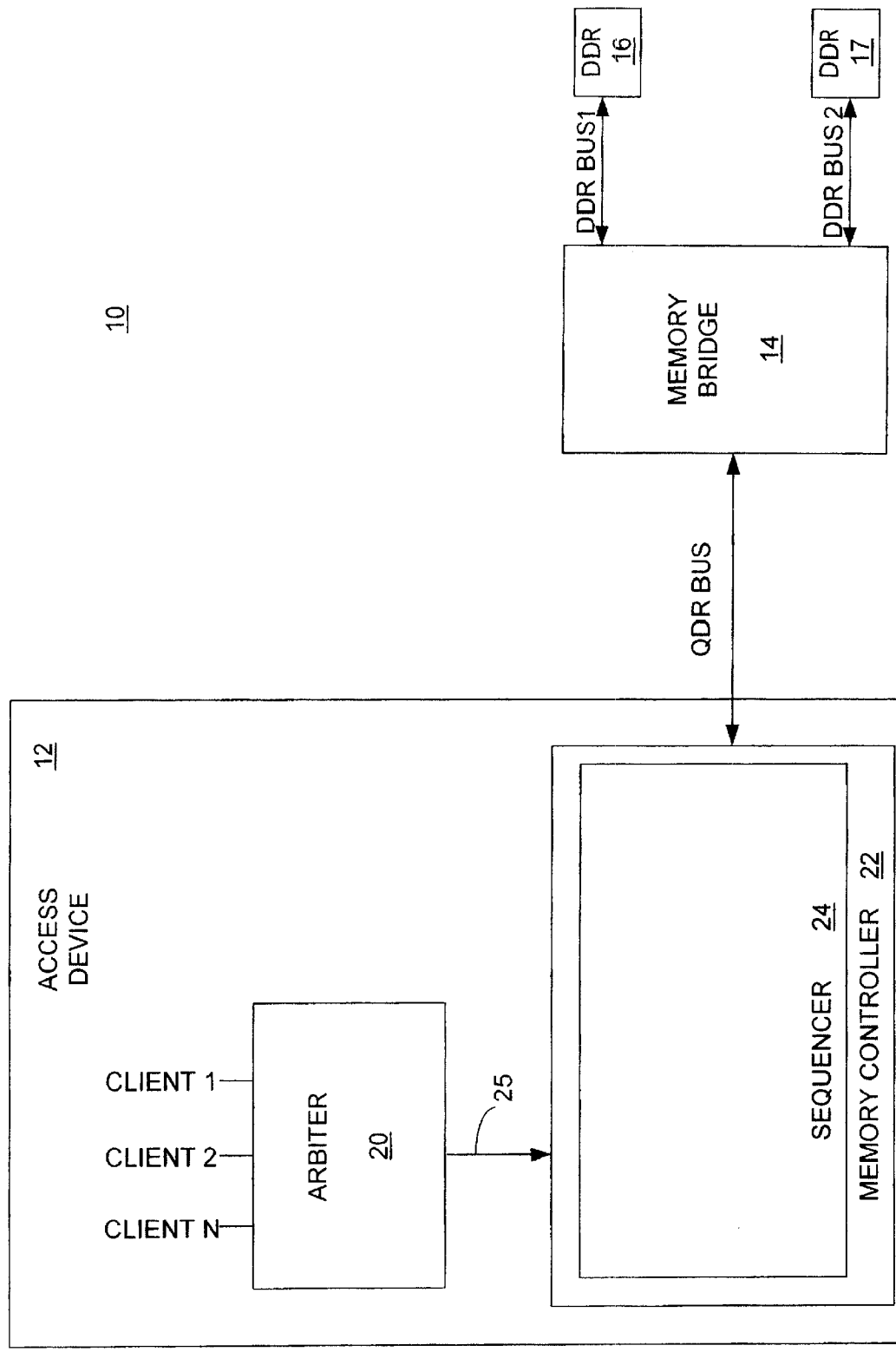
FIG. 1 illustrates, in block diagram form, a system in accordance with an embodiment of the present invention.

FIG. 1 illustrates a system 10 in accordance with a specific embodiment of the present invention. Specifically, the system 10 includes an access device 12, a memory bridge 14, and dual data rate (DDR) memory devices 16 and 17. The access device 12 is bi-directionally connected to the memory bridge 14 through a bus labeled QDR BUS, which represents a bus that can access data words at a rate four time greater than access commands are issued. The memory bridge 14, which is a control module having a specific purpose, is connected to memory device 16 through a bus labeled DDR BUS1, and to memory device 17 through a bus labeled DDR BUS2. DDR BUS1 and DDR BUS2 are busses that can access data words at a rate two times greater than access commands are issued.

The access device 12 includes an arbiter 20 that receives read and write data access requests from a plurality of clients (CLIENT1–CLIENTn). The arbiter 20 is connected to a memory controller 22 through internal bus 25. In one embodiment, bus 25 is a 256-bit data bus, though other sizes can be accommodated. The memory controller 22 includes a sequencer 24.

In a specific embodiment, the access device 12 is a multimedia device that performs audio, graphics and/or digital video processing. In operation, client requests are received from clients CLIENT1–CLIENTn at the arbiter 20, which prioritizes the order of the client requests. In one embodiment, any request from a first client can be prioritized over requests from any other client. Read access requests from one or more clients can be prioritized over write access requests from the same, or different, clients. Write access requests from one or more clients can be prioritized over read access requests from the same, or different, clients. In addition, it will be appreciated that other prioritization schemes can be implemented.

The prioritized request is provided to the memory controller 22. A sequencer 24, of the memory controller 22, controls the time and manner that access commands are generated on QDR BUS. In addition, the memory sequencer 24 controls when write data is generated. In one embodiment, the sequencer, or other portion of the memory controller 22, can keep track of the order of read data to be received by the access device 12, in addition, the sequencer can keep track of the time that read data is to be returned when the system 10 is a synchronous memory system.

In one embodiment, for a 200 MHz clock, the memory controller 22 can generate an access request every 5 Ns, and provide or receive a data word over the QDR BUS every 1.25 Ns. The memory bridge 14 receives the memory access commands from the access device 12, and provides data to, or retrieves data from, the memories 16 and 17 by providing access commands to the memories 16 and 17. The access command provided to the memories 16 and 17 are based on the command received from the access device. Note the command provided to the memories 16 and 17 is a representation of the command received from the access device in that the provided command may have a similar or different protocol than the command received from device 12. In one embodiment, access commands are provided from the memory bridge 14 to the memories 16 and 17 at the same rate as they are received at the bridge. However, while the commands are provided at a rate of 200M commands/second the data is transferred between the bridge 14 and each of the memories 16 and 17 at a rate of 400M words/second. In this manner, four data words are received at memory bridge 14 during a single clock cycle, assuming an average of on clock cycle per issued command. It will be appreciated, that the system or apparatus of FIG. 1 can be partitioned in different manners. For example, the access device 12 and the memory bridge 14 can be combined on an integrated device to accesses external memories 16 and 17. Likewise, the memory bridge 14 can be integrated with memories 16 and 17 to act as a control module for an integrated memory device. For example, memories 16 and 17 can represent separately accessible memory array cores. It will be appreciated by one of ordinary skill in the art that an integrated device would include a semiconductor device, and a packaged device which can contain one or more semiconductor devices. Specific embodiment(s) for accomplishing the data access using system 10 of FIG. 1 are disclosed in FIGS. 2–7.

FIGS. 2–5 are tables that illustrate bus activity of the system 10 in accordance with specific embodiments of the present invention. Each row of FIGS. 2–5 represent a specific amount of time relative to a clock signal. Generally, each row represents one clock cycle. For example, each row can represent 5 Ns corresponding to one cycle of a 200 MHz clock. Each of the columns in the figures represent a different bus, or bus portion, of the system of FIG. 1. For example in FIGS. 2–5, a column, labeled QDR CMD, represents the control portion of QDR BUS; a column labeled DDR CMD, represents the control portion of DDR BUS1 and DDR BUS2; a column labeled DDR DATA represents the data portions of DDR BUS1 and DDR BUS2; and a column labeled QDR DATA represents the data portion of QDR BUS.

One timing constraint associated with the system of FIG. 1, and adhered to in FIG. 2–5, requires that data busses be idle for at least two clock cycles between different access types. For example, as illustrated in the tables of FIGS. 2–5, there are at least two idle cycles on each of the data busses of between read data being asserted and write data being asserted on any given bus. It will be appreciated that in other embodiments that an idle time of greater than, or less than, two cycles can be implemented.

FIG. 2 illustrates a basic data access operation of the system of FIG. 1 in accordance with a specific embodiment of the present invention. During the basic data access operation, the memory controller 22 of the device 12 allows each read, or write cycle to complete in order. For example, all data for a specific access must be completed on the QDR BUS and at least two idle cycles occur before data from a next access can be provided to the QDR BUS.

During times T0–T3, the memory controller 22 initiates four data reads R0–R3 respectively by asserting the appropriate control signals onto QDR BUS. In a specific embodiment, the QDR BUS control signals can be issued a frequency of 200M commands per second. In one embodiment, each read command is a request to receive four data words during a single cycle.

The progress of each data access through the system of FIG. 1 is indicated by the tables of FIGS. 2–5. For example, in FIG. 2, R0 indicates bus activity associated with a first read request. At time T0, the column labeled QDR CMD contains R0, which indicates a command portion of the read request R0 has been driven onto a command, or control, portion of the QDR BUS. Also during time T0, in one embodiment, the command information is latched at the memory bridge 14. At time T1, no bus activity relative to access R0 occurs, as the command information is decoded by the memory bridge 14.

At time T2, the column labeled DDR CMD contains R0, indicating that control signals representing a command associated with the read request R0 has been provided by the memory bridge 14 to a portion of the DDR busses, DDR BUS1 and DDR BUS2. During times T2–T4 the requested data is acquired by the DDR memories 16 and 17. At time T5, the column labeled DDR DATA contains R0, which indicates that data associated with the read request R0 has been provided from the memories 16 and 17 to the data portion of the DDR busses. Note that each DDR memory 16 and 17 is responsible for providing one half of the data associated with each read request. Also during time T5, the data is latched at the memory bridge 14. At time T7, the column labeled QDR DATA contains R0, which indicates that the data associated with the read request R0 has been provided to the data portion of the QDR BUS. Subsequent requests for read data are consecutively numbered, for example, R1 is the next request for read data.

In accordance with the two idle cycle constraint describe above, write data cannot be provided to the QDR BUS following a read access until two idle cycles have occurred on the data portion of the busses. Therefore, when a write is to occur immediately after a read, the memory controller 22 needs to assure two idle cycles occur on the data portion of the QDR BUS. This is generally controlled by the sequencer 24, which is designed to accommodate idle cycles. Therefore, the memory controller 22 begins the write access cycle W0 at cycle T12 by providing the control information for W0 to the control portion of the QDR BUS. During the next cycle, T13, the data associated with the W0 write is driven onto the data portion of the QDR BUS. Note that two idle cycles, T11 and T12, have been maintained on the QDR BUS between the read data of the last read R3 being driven and the write data of the first write W0 being driven onto the QDR BUS.

Control information for writes W1–W5 sequentially follow W0 during times T13–T17. The data for accesses W1–W5 is written to the data portion of QDR BUS during times T13–T19. During times T14–T19 the write control information W0–W5 is provided to the DDR busses. In the specific embodiment illustrated, control data is provided in parallel to DDR BUS1 and DDR BUS2 so that their respective memories will each store one-half of the write data during a single clock cycle. During times T15–T20 the write data information W0–W5 is provided to the DDR busses. For example, during time T15 two words of W0 data are provided sequentially to DDR BUS1 and the other two words of data are provided sequentially to DDR BUS2.

During times T20–T28, read accesses R4 and R5 occur in a manner similar to the read accesses described previously. During times T30–T33, a write access W6 occurs in a manner similar to the write accesses described previously. Therefore, by driving the busses of system 10 in the manner illustrated in FIG. 2, alternating read and write operations result in the last write access W6 completing at time T33.

FIG. 3 illustrates a data access operation in accordance with the present invention that uses a read buffer within the memory bridge controller 14. Using a read buffer allows for four additional read accesses to occur in two fewer cycles than the basic access described in FIG. 2. The specific embodiment of FIG. 3 includes the columns of FIG. 2, plus two new columns. A first new column labeled WCP contains an X when a Write Cycle Preview node of the QDR BUS is asserted. A second new column, labeled RBUF, indicates the cycle during which data is stored in a read buffer of the memory bridge 14.

The write accesses W0–W5 of FIG. 3 occur at the identical time and in an identical manner as the write accesses W0–W5 described with reference to FIG. 2. The read accesses of FIG. 3, however, are different from the read accesses of FIG. 2 due to the use of a read buffer in the memory bridge 14.

Eight read access requests R-4 through R3 are initiated by the memory controller 12 during times T0 through T7 respectively. Not that read access requests R-4 through R-1 represent four additional read requests that were not issued during the basic access scheme of FIG. 2. The read requests R-4 through R3 are provided to the command portion of the DDR busses during times T2 through T9 respectively. During times T5–T12 the requested data R-4 through R3 is provided to the data portions of the DDR buses. The data R-4 through R3 is stored into the read buffer of the memory bridge 14 during times T6–T13 respectively. The first four data words R-4 through R-1 are provided to the data portion of QDR BUS during times T7 through T10. Also asserted at time T10 is the WCP (Write Cycle Preview) node, which prevents any additional read data from being provided to the QDR BUS at time T11.

It is useful to compare at time T10 the status of the basic system of FIG. 2 to the status of the system of FIG. 3 having a read buffer. At time T10, each of the system implementations of FIGS. 2 and 3 have provided data for four read cycles back to the QDR BUS. The difference at time T10 is that the memory bridge controller 14 has already stored in its read buffer the data for the next four read requests R0 through R3. Also at time T10, the controller 12 asserts the WCP portion of the QDR BUS. This notifies the memory bridge 14 in advance that a write command, which is prioritized, is coming, and that the memory bridge 14 should stop transferring read data to the QDR BUS so that two idle cycles will occur before the write data is written to the QDR BUS. Therefore, the data for requests R0 through R3 is not written to the QDR BUS immediately following the read data for requests R-4 through R-1, however, the data for requests R0 through R3 is buffered in the memory bridge controller 14 and can be provided to the QDR BUS immediately following two idle cycles after the write cycle is completed. Referring to FIG. 3, the last write data for W5 is provided to the QDR BUS at time T18, and read data for R0 through R3 is provided to the QDR BUS during times T21 through T24.

The next read requests R4 and R5 begin at times T20 and T21, and overlap with the completion of read accesses R0–R3. Specifically, the memory controller 22 provides the command portion of the read requests R4 and R5 to QDR BUS at times T20 and T21 respectively. At time T22, the command portion of the read access R4 is provided to DDR BUS1 and DDR BUS2, followed by the command portion of the read access R5 at time T23. At time T25 the data of the read access R4 is provided to DDR BUS1 and DDR BUS2. At time T26, the data of the read access R4 is stored in the read buffer, and the data of the read access R5 is provided to DDR BUS1 and DDR BUS2. However, data associated with the read access R4 is not immediately provided to the QDR BUS because WCP has indicated a write is going to occur, which will provides data to the QDR BUS at time T27.

Note that at time T24 the write cycle preview (WCP) line was asserted to indicate that at time T26 a write access (W6) will be initiated. Based on the asserted WCP line, the memory bridge 14 will make sure that the QDR BUS data lines and the DDR BUS data lines are idle for at least two time cycles before the write occurs. This results in the data for R4 and R5 remaining buffered within the memory bridge 14 until after the write data has been provided to QDR BUS. In FIG. 3, the read data of accesses R4 and R5 are provided to the QDR BUS at times T30 and T31.

As indicated by the timing of FIG. 3, use of a read buffer allows for all of the accesses of the basic system of FIG. 2 to occur, plus four additional read accesses, in two fewer clock cycles than the basic implementation of FIG. 2.

FIG. 4 illustrates an implementation of the present invention using a write buffer within the memory bridge 14. Note no read buffer is used with this implementation. Using a write buffer allows for more efficient implementation of accesses than the basic implementation of FIG. 2. The table of FIG. 4 includes a column labeled WBUF that indicates when data is initially stored in the write buffer of the memory bridge 14.

The read accesses R0–R3 of FIG. 4 occur at the identical time and in an identical manner as the read accesses R0–R3 discussed with reference to the basic implementation of FIG. 2. The write accesses of FIG. 4, however, are different from the read accesses of FIG. 2 due to the use of a write buffer in the memory bridge 14.

Because the Memory Bridge 14 has a write buffer, the memory controller 22 can provide write data to the bridge 14 prior to providing the write command to the data bridge. This is illustrated at times T2–T4 where the data for write accesses W0–W2 is provided to the data portion of QDR BUS, and latched in to WBUF during times T3–T5 respectively. Only three data words were provided to the QDR BUS because the sequencer of the memory controller anticipated receiving the read data for R0 at time T7. Note that in one embodiment the memory bridge will generally receive a data strobe signal from a memory controller 22 indicating when to latch the provided write data.

The sequencer 24 provides the command portion of write accesses W0–W2 at times T8–T10, which overlaps with the reception of read data R1–R3 on the QDR bus. Starting at time T10, the memory bridge 14 provides command information for write access W0–W2 to DDR BUS1 and DDR BUS2. Beginning at time T11, memory bridge 14 provides buffered write data for accesses W0–W2 to the data portions of the DDR buses. Note, the sequencer 24 provided command information for W0 during time T8 to allow for the two idle cycles between the read data R3 being driven on the QDR BUS and the write data W0 being driven on the QDR BUS. A one-cycle delay occurs at time T11 between the command of W2 being asserted on the QDR BUS and the command of W3 being asserted. Without this delay only one idle cycle would occur on the QDR BUS between access R3 and access W3. By delaying W3, two idle cycles occur on the QDR BUS during times T11 and T12.

Note that the data of write accesses W3–W6 is not indicated as buffered because these accesses occur in the same basic manner described in FIG. 2. However, depending upon the specific implementation the data may actually be buffered. For purposes of discussion, only the write data that is buffered in advance of its corresponding command is illustrated as buffered in FIG. 4.

Read accesses R4 and R5 begin at times T17 and T18 respectively, and proceed according to the basic embodiment described with reference to FIG. 2.

The final write access W6 begins at time T19 of FIG. 4, where the data for W6 is provided to the QDR BUS at time T20 prior to the W6 command being asserted. The sequencer 24 provides command information for write access W6 at time T23. By waiting until time T23, it is assured that two idle cycles occur on the DDR busses between read access R5 and write access W6. At time T25 command information is provided to the DDR Buses. At time T26, the data for W6, which is buffered, is provided to the DDR Buses.

Providing a write buffer in the manner illustrated in FIG. 4 allows the same amount of data to be accessed as in the basic implementation of FIG. 2 in eight fewer clock cycles.

FIG. 5 illustrates the flow of data on the busses of FIG. 1 when both a read buffer and a write buffer are implemented. In FIG. 5, write accesses are prioritized over read accesses. Implementing both the read buffer, discussed with reference to FIG. 3 and the write buffer, discussed with reference to FIG. 4, in the memory bridge 14 results in the saving of nine clock cycles over the basic implementation.

Figure 6:
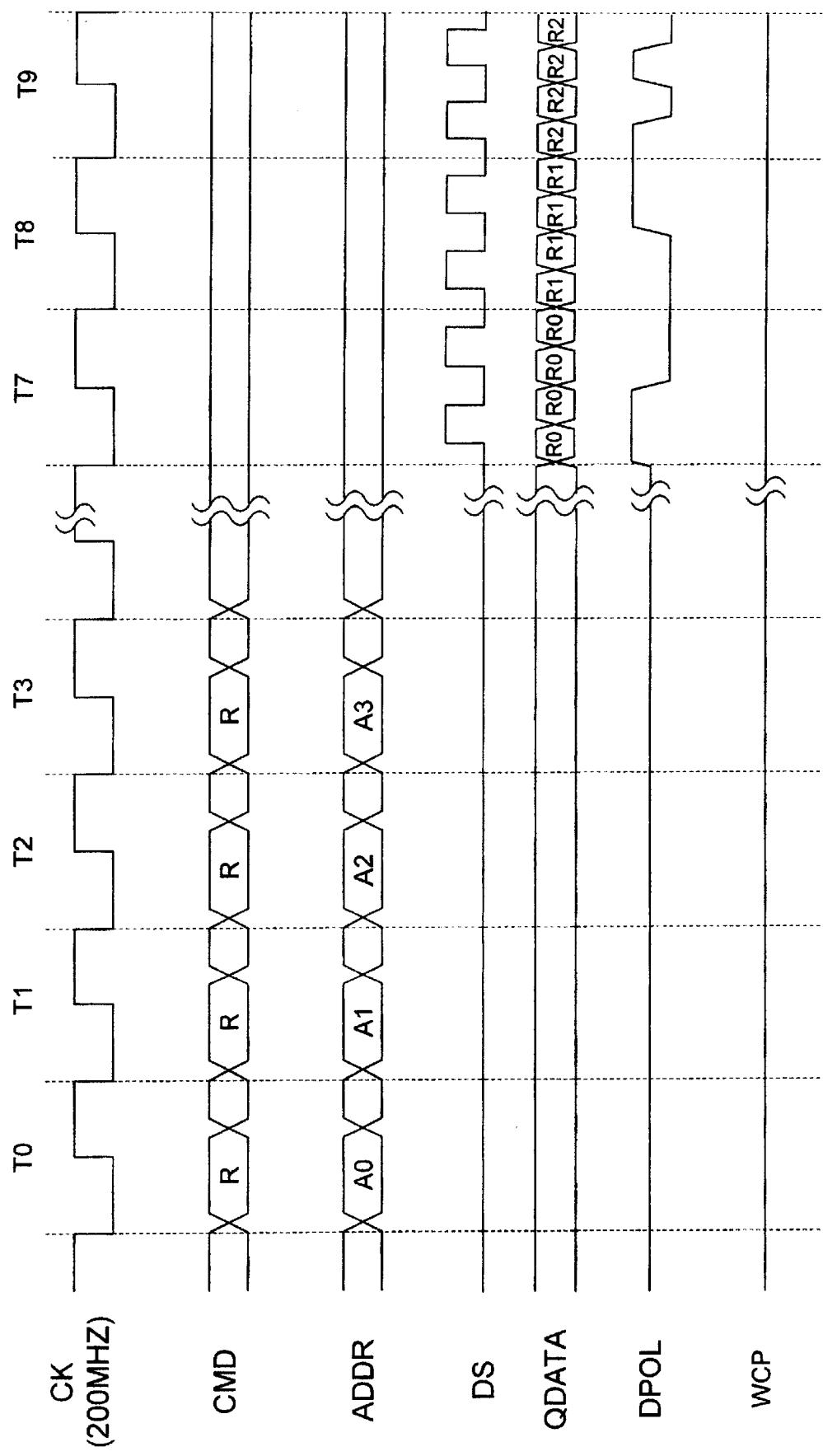
FIGS. 6–8 illustrate, in wave diagram form, a specific example of signals associated with the bus activity of FIGS. 2–5.
Figure 7:
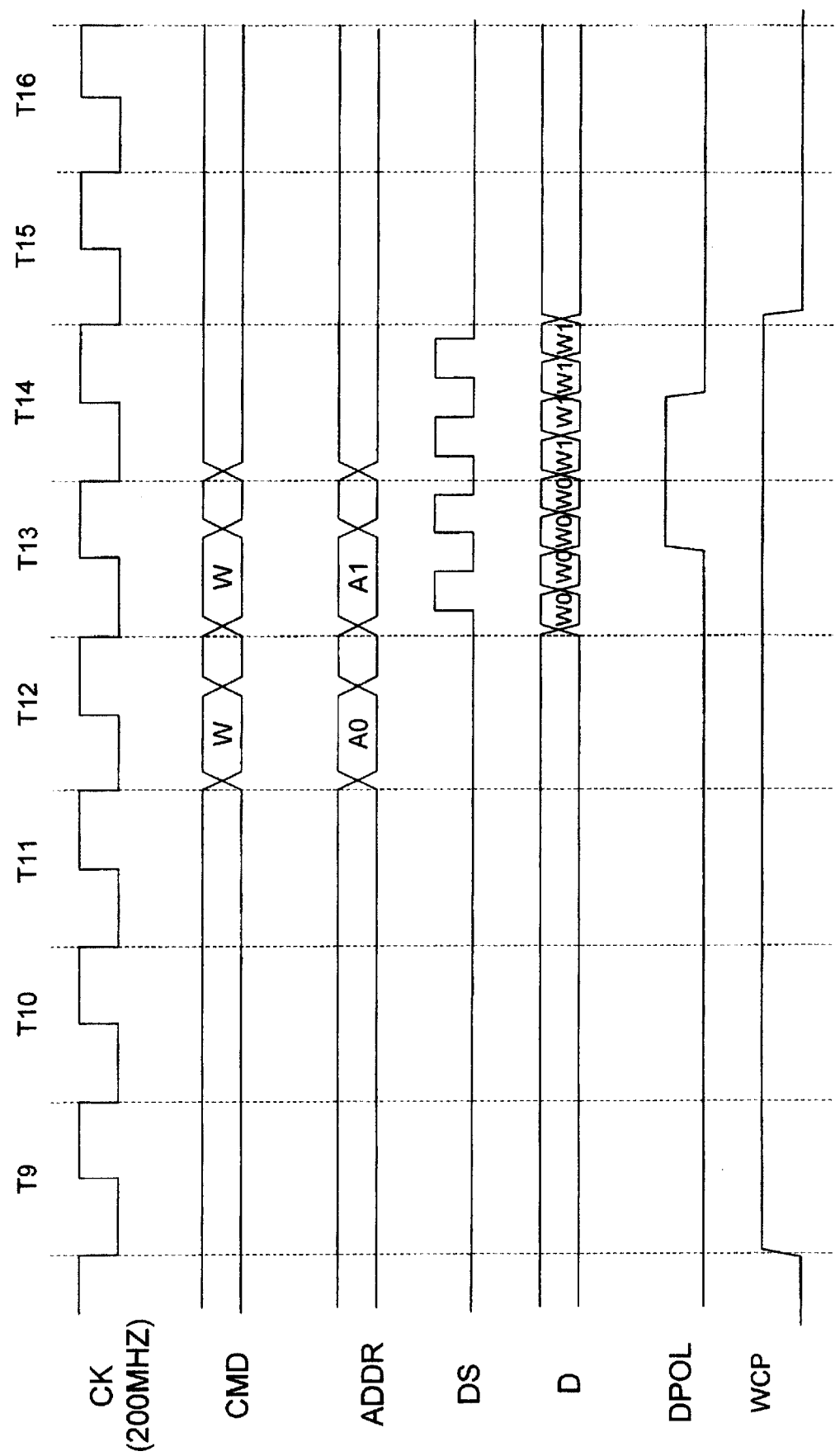

It will be appreciated by one of ordinary skill in the art that a variety of command protocols can be used to request access of data. For example, a standardized or custom set of commands can exist between the access device 12 and the memory bridge 14. The commands provided from the memory bridge 14 to the memories 16 and 17 are based upon the specific control protocol of the memories 16 and 17. FIGS. 6 and 7 provide specific embodiments of bus activity between the access device 12 and the memory bridge 14.

FIG. 6 illustrates bus activity on QDR BUS between the access device 12 and the memory bridge 14 for a read cycle. In the embodiment illustrated, time cycles T0–T3 and T7–T9 correspond to the similarly numbered time cycles of FIG. 2. In one embodiment, each time cycle starts on a falling clock edge. In other embodiments, each time cycle can start on a rising clock edge. FIG. 6 illustrates four read commands being provided by the access device 12 during the first half of each clock cycle T0–T3. Each read command includes control signals (CMD) and an address value (ADDR). Note in FIG. 6 "R" represents the read control signals, and A# represents an address location, where # is an integer identifying a specific access.

The next activity on the QDR BUS, for this access, is the return of data (QDATA) from the memory bridge. As illustrated, four words of data are returned during cycle T7. In addition to the data words, the access device also receives a data strobe signal (DS) over the QDR BUS. In one embodiment, the data strobe transitions each time new data is available on the data bus. Therefore, the DS signal has a frequency twice that of the clock frequency during a time when data is being transferred over the QDR BUS. The DS signal can transition at the approximate same time as the data changes values, or the DS signal can transition near the center of each data word, where the center is a time when the data on the QDR BUS is expected to be stable. In other embodiments, the data strobe signal can have a rate equal the clock signal, and be multiplied by the memory bridge to provide four latching edges.

The timing of FIG. 6 will change when read data is held in a buffer of the memory bridge 14. Specifically, the time during which data is returned to the access device 12 can vary depending upon prioritized write or write cycles. While, in one embodiment, it is guaranteed that data is returned to the QDR BUS in the order it was requested, in another embodiment, the data can be driven onto the QDR BUS out-of-order. When the data is returned out of order, some type of data identifying information is maintained. Such identifying information indicates the requested order of the data, or the requesting client of the data.

Note that FIG. 6 further illustrates data polarity signal (DPOL). One or more data polarity signals are used to minimize the amount of power and noise that occurs with the high frequency data busses of FIG. 6. Generally, a data polarity signal indicates a polarity of the data values being driven on the data portion of the QDR BUS. For example, in one embodiment, when DPOL is asserted, it indicates that the values for the data bus are to be interpreted normally by the receiving device. However, when DPOL is negated, the values driven on the data bus are an inverted representation of the actual data values. Therefore, the receiving device needs to invert the received values. Specific implementation(s) of such a noise and power reduction scheme is disclosed in patent application Ser. No. 09/498,586 filed on Feb. 4, 2000, which is hereby incorporated herein by reference.

FIG. 7 illustrates bus activity between the access device 12 and the memory bridge 14 for a write cycle. In the embodiment illustrated, write accesses initiated at times T12 and T13 are illustrated and correspond to similarly numbered cycle times of FIG. 2. In one embodiment, each time cycle starts on a falling clock edge. In other embodiments, each time cycle can start on a rising clock edge.

FIG. 7 illustrates a write command, which includes control signals (CMD) and an address value (ADDR). Two write commands are provided during the first half of each clock cycle T12–T13. The next activity on the QDR BUS occurs when data is provided to the data bus portion (QDATA) of the QDR BUS. As indicated, four words of data associated with the first write W0 are provided to the data bus (D) during time T13, and four words of data (D4–D7) associated with the second write W1 are provided to the data bus during time T14. In addition to the data words, the access device also provides a data strobe signal (DS) over the QDR BUS. In one embodiment, the data strobe transitions each time new data is available on the data bus. Therefore, the DS signal has a frequency twice that of the clock frequency during the time when data is being transferred over the QDR BUS. The DS signal can transition at approximately the same time as the data values change on the data bus, or the DS signal can transition at a center point where the data on the QDR BUS is expected to be stable.

The signal WCP is asserted beginning at cycle T9, so that the memory bridge can stop driving data onto data lines, in anticipation of the read data being received.

Figure 8:
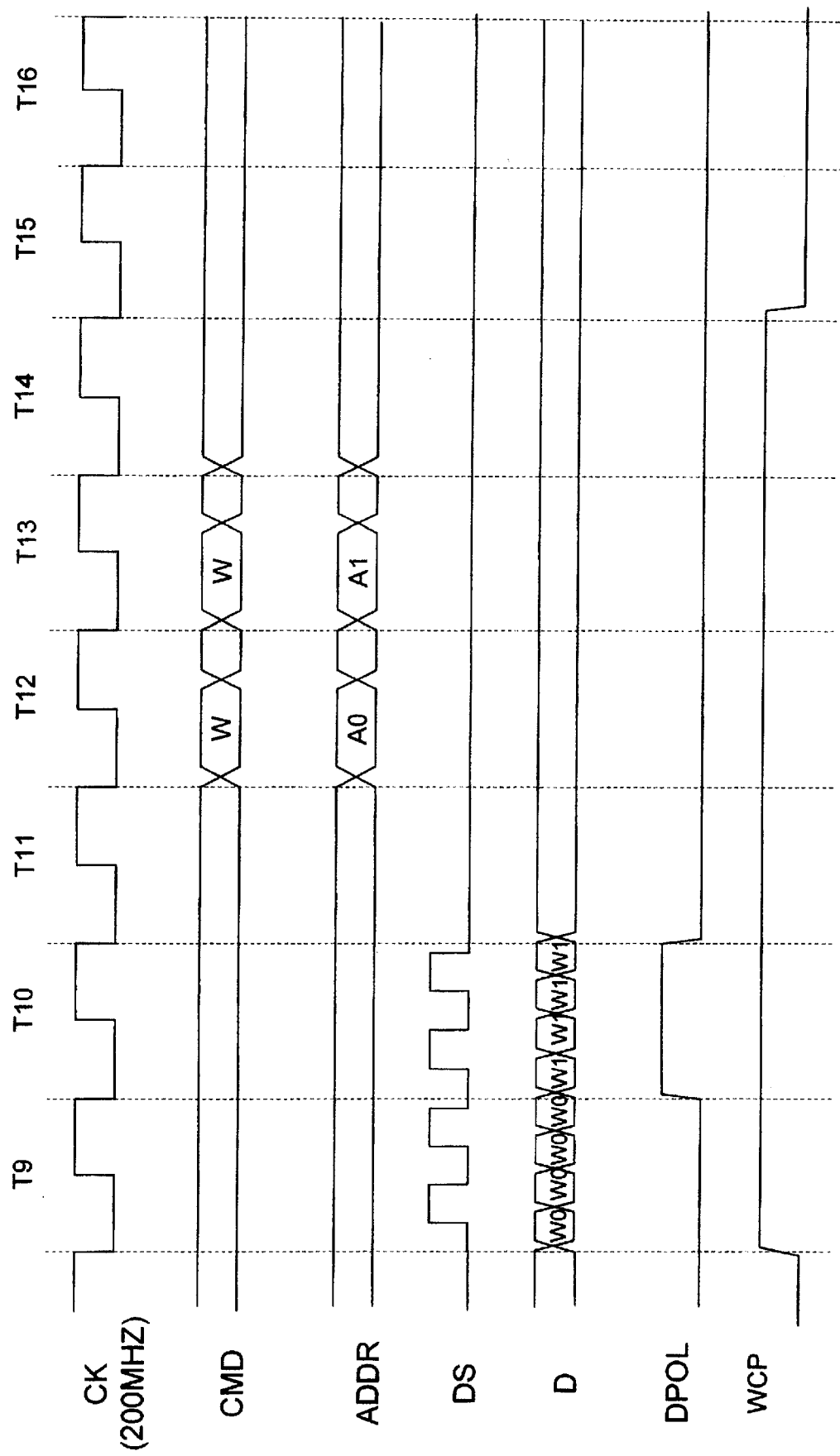

The timing of FIG. 7 will change when the memory bridge 14 includes a write data buffer. Specifically, the time during which data is provided to the memory bridge 14 can vary. In one embodiment, as illustrated in FIG. 8, the write data can be buffered in the memory bridge 14 by providing data strobe and data before a corresponding write command is issued. This sequence would be interpreted by the memory bridge 14 as an indication to buffer the write data for use with the next write command. The generation of an active WCP signal can be delayed based upon how much data is buffered. For example, if four words of data have been sent to the memory bridge 14 for buffering, the WCP signal of FIG. 8 can be delayed by one cycle.

Note that FIG. 7 has a DPOL signal similar to the data polarity signal of FIG. 6. These signals are provided by the access device to indicate the polarity of the data being sent to the memory bridge.

Figure 9:
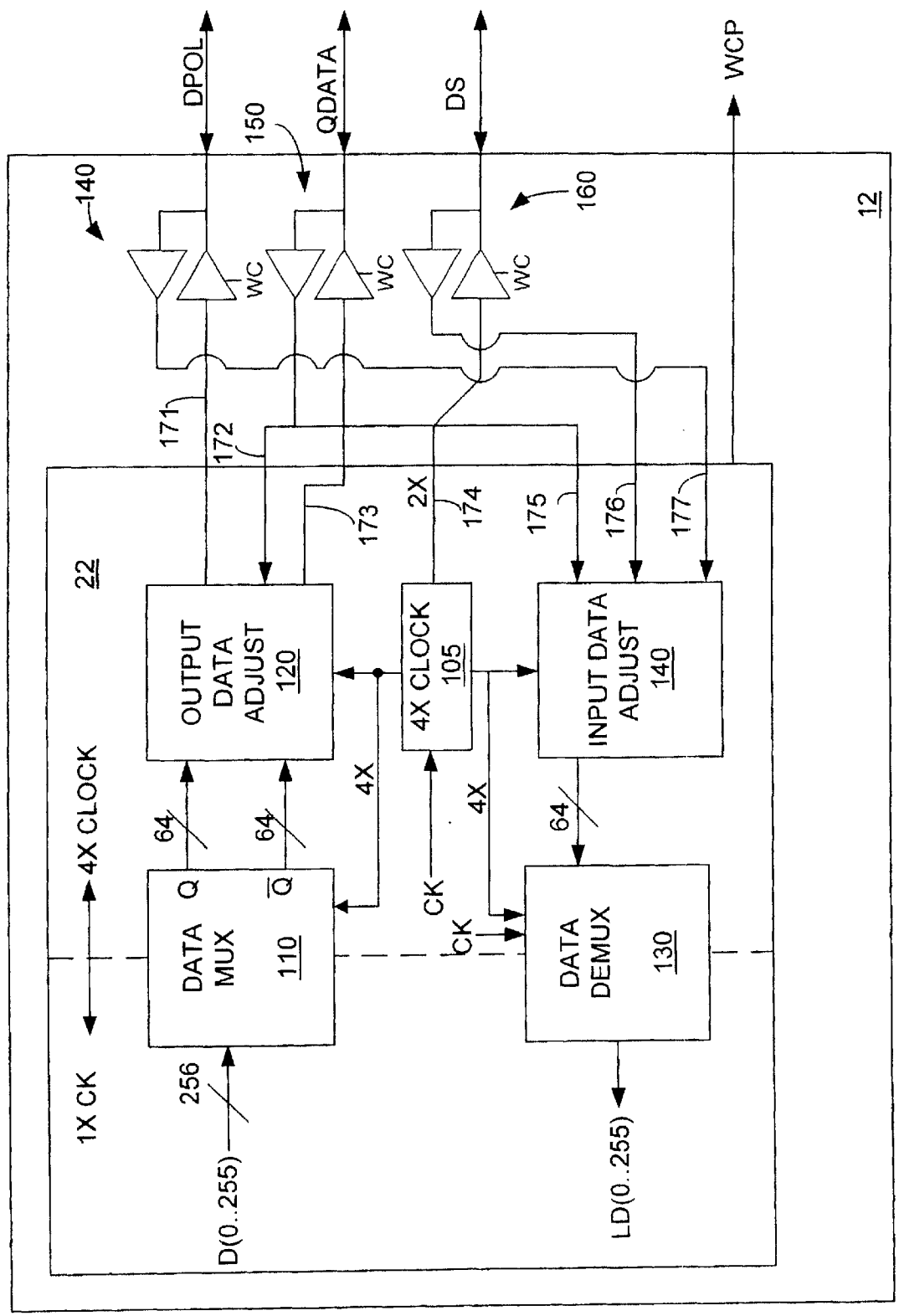
FIG. 9 illustrates, in block diagram form, a portion of the memory controller of FIG. 1 in greater detail.

FIG. 9 illustrates a block diagram for a portion of memory controller 22 of access device 12 that provides the data, data strobe, and data polarity signals to the QDR BUS. In the specific embodiment of FIG. 9, the data bus portion (QDATA) of the QDR BUS is a 64-bit wide bi-directional bus. The output driver of the bi-directional buffer 150 is enabled by a write control signal (WC). The signal WC is asserted by the controller 12 when write data is being provided to QDATA. With reference to the basic read access of FIG. 2, the memory controller 12 asserts the signal WC during those times when write data is indicated as being driven on the QDR data bus. For example, during times T13–T18 and T31 the WC signal would be asserted.

The data strobe line (DS) line is connected to a bi-directional buffer 160 that either receives a data strobe signal from the memory bridge 14, or provides a data strobe signal to the memory bridge 14 of FIG. 1. As previously discussed, the data strobe indicates when valid data word is present on the data bus.

The data polarity line, labeled DPOL, is a bi-directional node that receives or provides a polarity indicator from or to memory bridge 14. As previously discussed, the state of data polarity signal indicates the polarity of data on QDATA.

The write cycle predict line (WCP) is an output that provides a signal to the memory bridge 14 indicating that a write cycle is about to being. The data controller 12 will assert the write cycle predict signal in advance of the write cycle command to allow write data to be driven onto QDATA without delay. In one embodiment, as illustrated in FIG. 3, the WCP signal is asserted three cycles prior to the actual write command, to allow for two idle cycles on the QDR BUS prior write data being driven. For embodiments where more or fewer idle cycles are needed, the timing of WCP can vary accordingly.

During a write cycle, the memory controller 12 receives a 256-bit data word, D(0 . . . 255), from one of its clients. The 256-bit data word is received at the data multiplexer 110, which splits the 256-bit data word into four 64-bit data words that are to be transmitted serially. The data multiplexer 110 generates both the actual and inverted data values for the 64-bit words so that either the actual data values or the inverted data values can be driven onto QDATA based upon the DPOL value.

The true and inverted values for the 64-bit data words are provided to the output data adjust portion 120. As previously indicated, the output data adjust portion 120 determines the state of the data polarity signal (DPOL), which indicates whether the true or inverted values of the 64-bit data words are to be provided to the data bus. In one embodiment, there can be more than one data polarity signal. For example, two data polarity signals can exist, one for the lower 32-bits of the data bus, and one for the upper 32-bits of the data bus. As previously referenced, additional details concerning a specific embodiment of output data adjust module 120 can be found in pending application Ser. No. 09/498,586.

The data from the 256-bit data bus is received at data multiplexer 110 at a first data rate, for example 200 MHz, and provided as 64-bit data words at a second data rate that is four, or more, times greater than the first data rate. To accommodate the multiple data transfer rates a 4X clock is generated by the clock multiplier 105. In addition, clock multiplier 105 provides a 2X clock used to generate the data strobe signal, DS.

During a read cycle, the 64-bit data words received from the QDATA are latched into the input data adjust portion 140 based upon the received data strobe signal. The input data adjust portion 140 will provide correct data polarity values to the data demultiplexer 130. The data demultiplexer 130 receives four sequential 64-bit data words from the input data adjust portion 140 and provides a single 256-bit data word at its output at a reduced data transfer rate. The 256-bit data word is provided to a requesting client. The input data adjust portion 140 receives the 4X clock from the clock multiplier 105 to manipulate the 64-bit data, while the data de-multiplexer 130 receives the 4X clock and the regular clock to provide the 256-bit data to the client. In addition to the functional blocks described, it will be appreciated by one of ordinary skill in the art that the control logic 12 will also generate the individual control signals which make-up the read and write commands.

Figure 10:
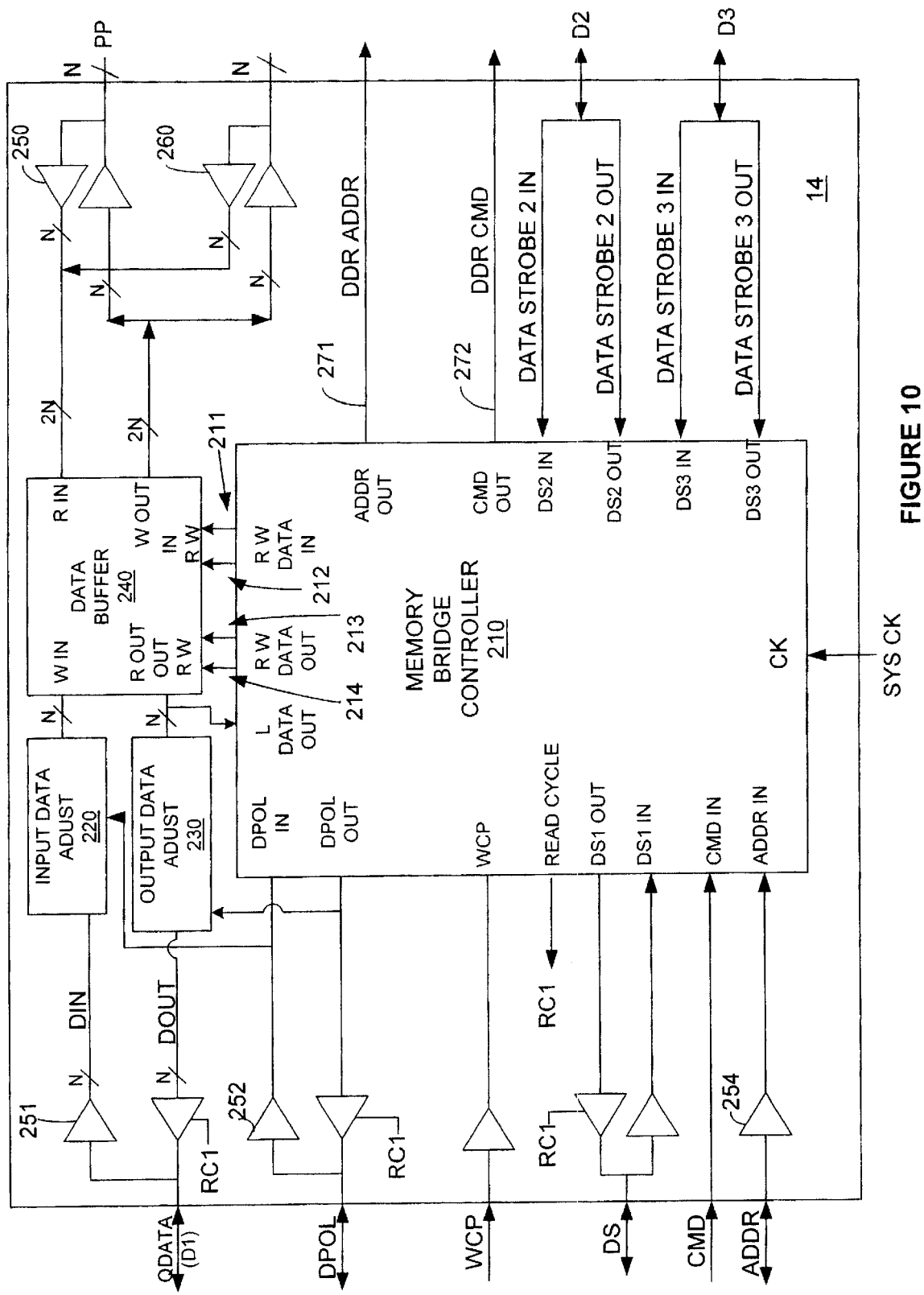
FIG. 10 illustrates, in block diagram form, a portion of the memory bridge FIG. 1 in greater detail.

FIG. 10 illustrates a specific implementation of a portion of the memory bridge 14 that includes memory bridge controller 210, input data adjust portion 220, output data adjust portion 230, and data buffer 240. In operation, the memory bridge controller 210 receives read and write access commands (CMD) from the access device 12 as described in FIGS. 2 through 7. Inputs to the memory bridge controller 210 include an address input port (ADDR IN) for receiving address data, a command input port (CMD IN) for receiving control signals, a first data strobe input port (DS1 IN) for receiving a data strobe indicating when data received at QDATA is valid, a second data strobe input port (DS2 IN) for receiving a data strobe indicating when data received at the DDR busses D2 and D3 is valid, a write cycle preview port (WCP) for receiving the write cycle preview signal that indicates that QDATA should no longer be driven by the output driver of buffer 251 of the memory bridge 14, a data polarity input port (DPOL IN) that indicates the polarity of received data; and read and write data in indicators (RW DATA IN) that control when the input buffer of the data buffer 240 is to buffer a next word of data.

Output ports of the memory bridge controller 210 include a data polarity output port (DPOL OUT) that provides a signal to access device 12 indicating the polarity of data being driven onto QDATA, a read cycle port (RC1) that enables the output drivers of the buffers to drive data onto various portions of the QDR BUS; a first data strobe output signal (DS1 OUT) that provides an indication when valid data is being driven onto the DATA BUS; read and write data out indicators (RW DATA OUT) that control when the output buffer of the data buffer 240 is to provide a next word of data; an address output port (ADDR OUT), a command output port (CMD OUT), a first data strobe out port (DS1 OUT) for providing a data strobe indicating when data provided to the QDR BUS is valid, a second data strobe out port (DS2 OUT) for providing a data strobe indicating when data provided to the DDR busses is valid.

During a write operation, the data received at QDATA is provided to the input data adjust module 220, which qualifies the received data value based on the state of the received DPOL signal to adjust for any inversion of data values. Next, the adjusted input data is provided to the data buffer 240. The data buffer 240 also receives an asserted signal on the node 211 from the memory bridge controller 210 indicating that the data at its input (WIN) is to be latched. In one embodiment, the data buffer 240 will store all write data in a FIFO (not illustrated) and provide the data to the drivers of buffers 250 and 260 from the FIFO. In other embodiments, only the write data that needs to be buffered, for example, write data that is received prior to a write command being issued, is stored into a memory location, such as a FIFO, for future use. The memory bridge controller 210 provides command information, which includes address and strobe information in manner similar to that described in reference to FIGS. 2–7.

In response to a read request on the CMD and ADDR lines, the memory bridge controller 210 will provide command information at DDR ADDR and DDR CMD indicating the data to be returned on the data lines DD1 and DD2. In one embodiment, a single command and address is sent to identical memory devices. In response, each of the memory devices, when dual data rate memories, operate simultaneously so that each memory device provides two sequential 64-bit data words, for total of four 64-bit data words, during a single clock cycle, to the data buffer 240.

The four 64-bit data words are received at a read buffer (not shown) of the data buffer 240. For example, the read buffer can be a FIFO that stores data from the memories in response to memory bridge controller 210 asserting a read input indicator on node 212. The memory bridge controller 210 provides the data to the output data adjust portion 230 by sequentially asserting a signal on the read output node 214. The output data adjust portion 230 provides data having the correct polarity to the data bus.

It will be appreciated by one of ordinary skill in the art, that the memory bridge controller 210 can be implemented in numerous ways. For example, the controller 210 of the memory bridge 14 can be configured so that the memory bridge acts primarily as a command FIFO, whereby the commands originated by the access device 12 are implemented in the same order that they are received by the controller 210. For example, referring to FIG. 2, the read and write accesses are completed in the order received by the access device 12. In another embodiment, the bridge controller 210 can access data stored in the memory devices out-of-order to take advantage of currently active memory channels or pages. For example, if a first access is to a first page of memory, a subsequent access can be taken out-of-order to allow continued access to the first page of memory. For example, given three sequential memory access requests R10, R11, and R12, accesses R12 can be retrieved prior to access R11 when it is determined by the memory bridge controller 210 to be more efficient to do so. The data received out-of-order from the connected memories can be buffered in the bridge 14 and returned to the access device 14 in-order, or can be buffered, or un-buffered, and returned to the access device 12 out-of-order.

When the memory bridge 14 has the capability to return data to the access device 12 out-of-order, a mechanism needs to exist to notify the access device 12 of the data being returned. One way of providing data to the access device 12 out-of-order is to provide some kind of tag indicating the identity of the data being provided. Such tag information can be a portion of the data's address, a client identifier, a channel indicator, or any other identifier capable of notifying the access device 12 of the actual sequence that the data is being returned.

It should now be appreciated by one of ordinary skill in the art, that the specific embodiments of the invention disclosed herein provide advantages over the prior art. For example, the access device 12 can receive 256-bit data words from its clients, while interfacing external the access device 12 with only 64-bit data words. This reduces the size of the access device component or apparatus. Further efficiencies are gained by implementing one or more of a read data buffer and a write data buffer in the memory bridge 14. Such data buffers to allow for more efficient data transfers. In another implementation of the present invention, one or more data polarity indicators are provided to reduce signal transitions on the data portion of the QDR BUS. Another advantage associated with the embodiments described herein, is that strobe edges used to transfer data between the access device 12 and the memory bridge 14 can be centered upon valid read and write data signals. It will be appreciated by one of ordinary skill in the art, that many specific implementations can be used to implement the claimed invention can exist. For example, the specific embodiments illustrated in the figures show a specific partitioning of specific modules. It will be understood that other partitions of the modules can be implemented. As another example, it will be understood by one of ordinary skill that the bridge 14 can map addresses received at from the access device 12 to physical address locations associated with the memories 16 and 17.

We claim:

1. A method comprising the steps of:
   receiving a first read request during a first time portion for first data;
   receiving a second read request during a second time portion for second data, wherein the second time portion is immediately sequential to the first time portion and the first and second read requests have an associated request rate;
   providing a third and a fourth read request to a first and a second memory locations respectively;
   receiving third read data and fourth read data from the first memory location and the second memory location respectively, wherein the third read data and the fourth read data are received at a first data rate that is greater than the request rate;
   providing the third read data and the fourth read data as the first data, wherein the third read data and the fourth read data are provided at a second data rate that is greater than the first data rate.

2. The method of claim 1, wherein the first data rate is equal to approximately twice the rate request.

3. The method of claim 1, wherein the second data rate is equal to approximately four times the request rate.

4. The method of claim 3, wherein the request rate is greater than approximately 100 million requests per second.

5. The method of claim 3, wherein the request rate is greater than approximately 200 million requests per second.

6. The method of claim 1, wherein the step of providing the third and fourth read requests include the third and the fourth read requests being provided substantially simultaneously during a third time portion.

7. The method of claim 6, wherein the step of providing the third and the fourth read requests include the third and the fourth read requests being a common read request.

8. The method of claim 1, wherein the step of receiving the third read data and the fourth read data includes receiving a first word and a second word as the third read and a third word and a fourth word as the fourth read.

9. The method of claim 8, wherein the first and second words are received sequentially during a third time portion and the third and fourth words are received substantially simultaneously with the first and second words.

10. The method of claim 9, wherein the step of providing the third and the fourth read data include the first, the second, the third, and the fourth words being provided sequentially during a fourth time portion, wherein the fourth time portion and the first time portion represent one clock cycle.

11. The method of claim 8, wherein the step of providing the third and the fourth read data include the first, second, third, and fourth words being provided sequentially during a third time portion, wherein the third time portion and the first time portion represent one clock cycle.

12. The method of claim 1, further comprising the step of:
    receiving a first write request after the step of receiving the first read request and before the step of providing the third and fourth read data;
    receiving a first write data; and
    wherein the step of providing the third and the fourth read data further includes waiting to provide the third and fourth read data until after the first write data is received.

13. The method of claim 1, further comprising the step of:
    receiving a first write request after the step of receiving the first read request;

receiving a first write data before the step of receiving the first write request; and storing the first write data until the first write request is received.

14. The method of claim 13, wherein the first write data includes a first word, a second word, a third word and fourth word that are received sequentially during a third time portion, wherein the first, second and third time portions are time periods associated with different clock cycles.

15. The method of claim 1, further comprising the steps of:

receiving a fifth read data and sixth read data from the first memory location and the second memory location respectively, wherein the fifth read data and the sixth read data are received sequentially at the first data rate; and providing the fifth read data and the sixth read data as the second data, wherein the fifth read data and the sixth read data are provided at the second data rate.

16. The method of claim 15, further comprising the steps of:

receiving a first write request after the step of receiving the second read request; and receiving a first write data, wherein the first write data is received after the step of providing the third and fourth read data and before the step of providing the fifth and sixth read data.

17. The method of claims 16, further comprising the step of providing a write request preview indicator prior to the step of receiving the first write request, and the step of providing the first data includes waiting to provide the first data in response to the write request preview indicator.

18. The method of claim 1, wherein the step of providing the first data set includes providing a data strobe that has an active edge centered on a first word of the first data, wherein the active edge is centered when the first word is valid and can be latched at a time of the active edge.

19. The method of claim 1, wherein the step of providing the first data includes providing a data strobe that has an active edge coincident with a transition of the first data.

20. The method of claim 1, wherein the first read request is received from a graphics controller.

21. The method of claim 1, wherein the first memory location and the second memory location are associated with separate dual data rate memory devices.

22. The method of claim 21, wherein the separate dual data rate memory devices include separate memory arrays.

23. The method of claim 1, wherein the step of providing the third and the fourth read data includes providing an identifier with the third and the fourth read data that indicates the third and the fourth data is the first data.

24. The method of claim 1, wherein the step of providing the third and the fourth read requests include the third and the fourth read requests being a common read request.

25. The method of claim 1, further comprising the step of:

adjusting a polarity of the third read data prior to the step of providing the third read data.

26. The method of claim 25, wherein the step of adjusting the polarity includes adjusting the polarity based upon a received polarity indicator.

27. An apparatus comprising:

a control port to receive data access commands at a first rate;

a first data port to send and receive data at a second rate in response to data access commands, wherein the second rate is at least four times greater than the first rate; and a second data port to send and receive data at a third rate in response to data access commands, wherein the third rate is greater than the first rate and less than the second rate.

28. The apparatus of claim 27 further comprising:

a buffer having a first port coupled to the first data port, and a second port coupled to the second data port, the buffer to store data to allow for an out of sequence access, wherein the out of sequence access allows for data associated with a first access command to be accessed at the first data port after data associated with a second access command is accessed at the data port, where the first access command is received before the second access command.

29. The apparatus of claim 28, wherein the first access is a read access and the second access is a write access.

30. The apparatus of claim 28 further comprising:

a data polarity port to receive a polarity indicator that indicates a polarity of data received at the first data port.

31. The apparatus of claim 30 wherein the data polarity port provides a polarity indicator that indicates the polarity of data sent at the first data port.

32. The apparatus of claim 28 further comprising:

a data polarity port to provide a polarity indicator that indicates a polarity of data sent at the first data port.

33. The apparatus of claim 28 wherein the apparatus is an integrated device wherein the control port and first data port are directly accessible external the apparatus and the second data port is accessible internal the apparatus.

34. The apparatus of claim 33 wherein the control port, the first data port, and the second data port are part of a control module; and the apparatus further includes:

a first memory having a data port coupled to the second data port.

35. The apparatus of claim 34 wherein the first memory further includes:

a second memory having a data port coupled to the second data port, wherein the second data port is for accessing the first memory and the second memory substantially simultaneously.

36. The apparatus of claim 28 wherein the control port, the first data port, and the second data port are part of a control module; and the apparatus further includes:

a first memory having a data port coupled to the second data port.

37. The apparatus of claim 36 wherein the first memory further includes:

a second memory having a data port coupled to the second data port, wherein the second data port is for accessing the first memory and the second memory substantially simultaneously.

38. The apparatus of claim 28 wherein the apparatus is an integrated device wherein the control port and first data port are accessible internal the apparatus and the second data port is directly accessible external the apparatus.

* * * * *

UNITED STATES PATENT AND TRADEMARK OFFICE
CERTIFICATE OF CORRECTION

PATENT NO.    : 6,502,173 B1
DATED         : December 31, 2002
INVENTOR(S)   : Aleksic, Milivoje et al.

Page 1 of 1

It is certified that error appears in the above-identified patent and that said Letters Patent is hereby corrected as shown below:

<u>Column 12,</u>
Line 11, please delete "locations" and insert -- location -- therefor;
Lines 30, 42 and 58, please insert the word -- the -- before the word "fourth";
Line 40, please insert the word -- the -- before the word "second";
Line 61, please insert the word -- the -- before the word "and";

<u>Column 13,</u>
Line 26, please insert the word -- the -- before the word "fourth";
Line 35, please delete the word "set";
Line 52, please delete the word "is" and insert the word -- are -- therefor;

<u>Column 14,</u>
Lines 21, 28, 31, 47 and 59, please delete "28" and insert -- 27 -- therefor.

Signed and Sealed this

Twenty-seventh Day of January, 2004

JON W. DUDAS
*Acting Director of the United States Patent and Trademark Office*